Nov. 4, 1947.   F. A. ENGEL ET AL   2,430,048
MECHANISM FOR DIGGING TRENCHES
Original Filed Dec. 3, 1941   2 Sheets-Sheet 2
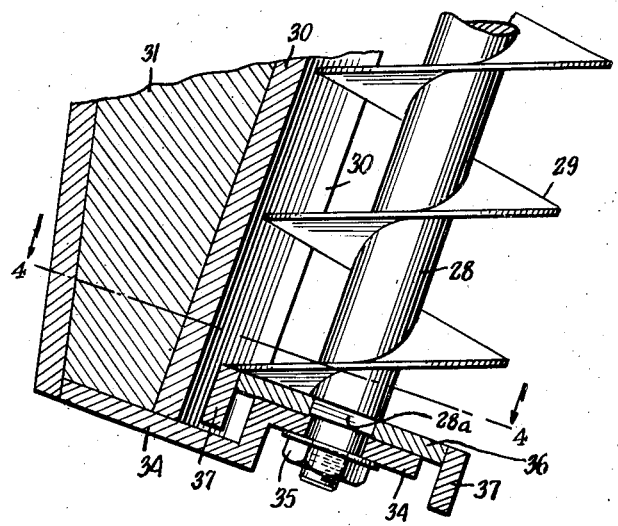
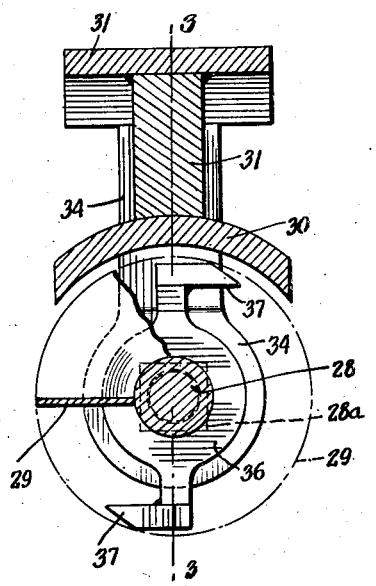
INVENTORS
Frank A. Engel + Dennis J. Manning
BY  Mocki Blum
ATTORNEYS Patented Nov. 4, 1947

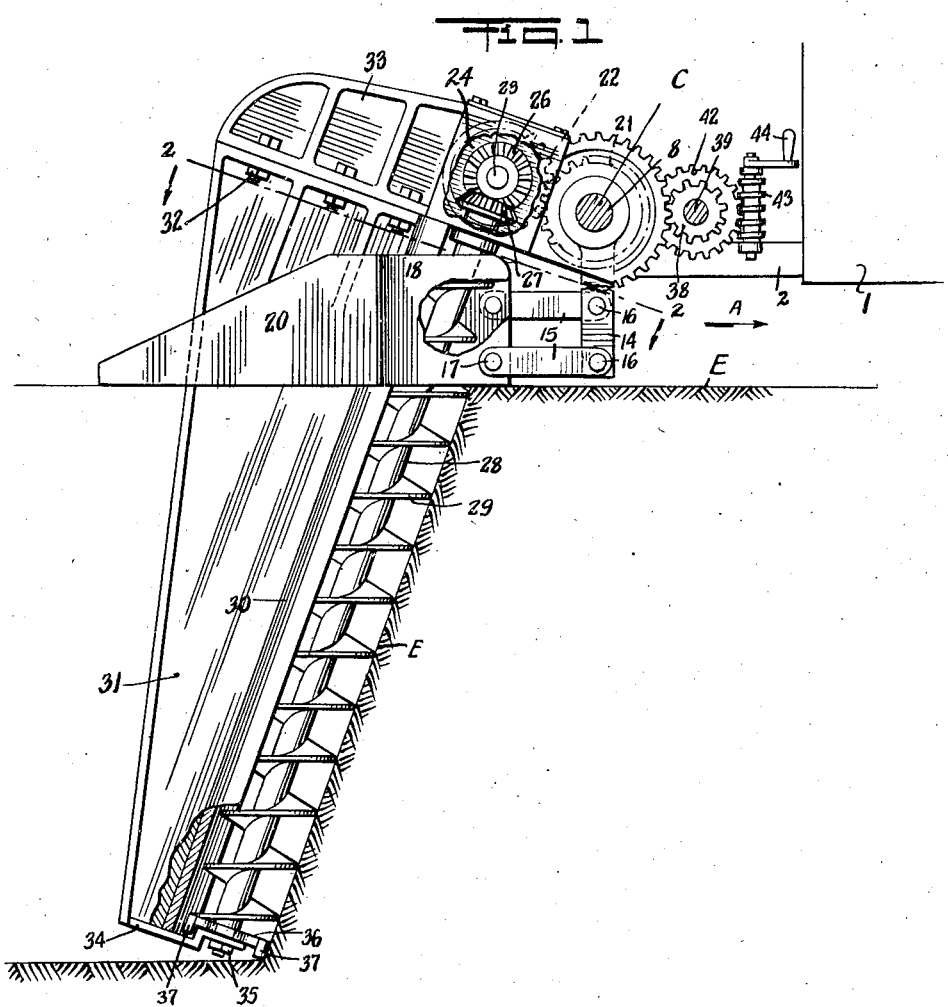

2,430,048

UNITED STATES PATENT OFFICE 2,430,048

MECHANISM FOR DIGGING TRENCHES

Frank A. Engel, Roselle, and Dennis J. Manning, Mountainside, N. J., assignors to Elizabeth Products Corporation, Elizabeth, N. J., a corporation of New Jersey Original application December 3, 1941, Serial No. 421,452. Divided and this application September 21, 1944, Serial No. 555,115

2 Claims. (Cl. 37—81)

Our invention relates to a new and improved mechanism for digging trenches and the like.

The main object of our invention is to provide a movable support in which a downwardly inclined auger is turnably mounted. This auger has cutting means at its bottom end, and a helical cutting flight which cuts and elevates the material which is to be elevated.

Other objects of our invention will be stated in the annexed description and drawings, which illustrate preferred embodiments thereof, it being understood that the above general statements of our invention are intended generally to explain the same, but without limiting the invention in any manner.

Fig. 1 is a vertical sectional view, partially in elevation, on the line 1—1 of Fig. 2.

Fig. 2 is a sectional view on the line 2—2 of Fig. 1.

Fig. 3 is a sectional view on the line 3—3 of Fig. 4.

Fig. 4 is a sectional view on the line 4—4 of Fig. 3, and it shows the lower part of the cutting and excavating tool or mechanism, and certain accessory parts, on an enlarged scale.

This application is a division of our application Serial No. 421,452, which has been issued as United States Patent No. 2,360,334 on October 17, 1944, reference being made to said patent as a disclosure of the entire machine.

The mechanism is mounted upon a movable support 1, which can be of any suitable type, such as a truck or tractor. We have not illustrated the supporting wheels or supporting tracks of the movable support 1, as they are conventional. This movable support 1 is provided with a frame which has longitudinal bars as illustrated by bar 2. The driven shaft 8 is mounted in suitable bearings in the frame bars. It has an axis C, as shown in Fig. 1.

Collars 9 are mounted loosely upon the driven shaft 8, so that the driven shaft 8 can turn freely relative to the collars 9. These collars are held against longitudinal shifting on shaft 8 by suitable means, as disclosed in U. S. Patent No. 2,360,344.

Referring to Fig. 1, each of the collars 9 has an integral depending arm or bracket 14, which is rigid with the respective collar 9. Each depending arm or bracket 14 has a pair of links 15, which are pivotally connected to the respective arm 14 at 16. Each pair of links 15 is also pivotally connected at 17 to a plough 18.

Such ploughs may be used if the trench is narrow and shallow. Any conveyor means can be used for moving the excavated material laterally away from one or both longitudinal walls of the trench.

As shown in Fig. 2, each plough 18 is laterally outwardly inclined, so that each plough 18 will deflect the excavated earth laterally away from the respective longitudinal wall of the trench.

Referring to Fig. 2, each plough 18 is associated with a retaining plate 20, which is pivotally connected by the pivot members 17, to the respective pair of links 15.

A spur gear 21 is fixed to the driven shaft 8, so that said driven shaft 8 and the spur gear 21 turn in unison. Said spur gear 21 is slidable along, but fixed against rotation relative to said shaft 8. Said shaft 8 passes through a bore of the hub of said spur gear 21, in the conventional manner. The spur gear 21 meshes with a spur gear 22, which is fixed to the jack-shaft 23. The jack-shaft 23 is provided with a suitable bearing in a casing 24. The jack-shaft 23 has a bevel gear 26 fixed thereto, and said bevel gear 26 meshes with a bevel gear 27.

The excavating tool has a helical flight or flange 29. Said flight has a sharp cutting edge. The tool is moved forwardly by the movable support, so that the height of the tool remains constant, if the depth of the trench is uniform.

The edge of the flight cuts the material to be excavated, substantially continuously from the bottom of the trench to the top of the trench. The flight also propels the cut material upwardly, substantially continuously along the entire height of the mass of cut material. If the tool is forwardly inclined, the mass of cut material is moved in a path which has a forward longitudinal component, so that the excavated material can be piled on the ground in front of the front end-wall of the trench, and the ascending cut material also exerts a forward longitudinal pressure at the rear of said pile of material. The edges of the segmental shield 30 are sufficiently close to the longitudinal walls of the trench, so that the cut material cannot pass rearwardly of said shield. The ascending cut material is therefore confined between the shield 30, the front end-wall of the trench, and the respective parts of the longitudinal walls of the trench which are formed by the cutting and lifting action of the excavating tool, in advance of the shield 30. The width of the shield 30 is substantially equal to the width of the flight or flights of the auger or cutting tool, in order to prevent any rearward flow of the cut material. The assembly of the excavating tool or auger and the shield 30 is open at the front of said assembly and arranged to pile the excavated material directly on the ground ahead of the open front end of said assembly.

The segmental shield 30 is fixed to a plate 31, which is fixed by means of fastening members 32, to the extension 33 of the casing 24.

A bottom support 34 is fixed to the plate 31, by welding or the like. Said bottom support 34 is provided with a perforation. The reduced bottom end of the shaft 28 extends through said perforation. Said reduced bottom end is threaded. Said reduced bottom end is held turnably assembled with the bottom support 34, by any suitable means, such as a nut 35. This nut 35 may have a clearance relative to the supporting member 34, or else any suitable anti-friction washer or the like can be interposed between the nut 35 and the adjacent face of the bottom support 34, so that the nut 35 can turn freely relative to the bottom support 34, in unison with the shaft 28. The nut 35 can be fixed to the reduced bottom end 28a, by means of a clamping screw or the like. A bottom cutting-member 36, which is provided with cutting blades 37, is fixed to the reduced bottom end of the shaft 28, in any suitable manner.

The support 1 is moved in the direction of the arrow A which is indicated in Figs. 1-3.

The excavating tool or auger cuts into the earth, assisted by the rotating cutters 37, and said tool raises the earth and then discharges the earth in advance of the front end of the trench which is being excavated. The earth-line is indicated in Fig. 1 by the reference letter E. The excavated earth is piled up in front of the front end of the trench, in the form of a pile whose initial outline is shown approximately by the broken line P in Fig. 2.

The driving mechanism, which includes the gears 21 and 22 and the shaft 8, may be located a sufficient distance above the earth-line E, so that a pile of earth of suitable height can be formed in front of the front end of the trench, so that this pile of earth will fall laterally in front of the ploughs 18. For example, the distance between the longitudinal axis of the shaft 8 and the earth-line E may be three feet, and even more.

The angle of the longitudinal axis of the shaft 28, relative to the vertical plane, is regulated as shown in U. S. Patent No. 2,360,334, in order to regulate the depth of the trench.

If it is desired to dig a shallow trench, the axis of the shaft 28 may be close to the horizontal position. The retaining plates 20 then function to confine the earth between the inner longitudinal surfaces of said plates 20 and the excavating tool, so that the thrust of the excavating tool can push the excavated earth forwardly, to be moved laterally by the ploughs 18. The earth which is thus pushed forwardly can pass laterally between the links 15, but not over the top of either plough 18.

The guard or shield 30 extends above the cutting flight 29 of the tool and above the top of the trench, so that the tool acts positively to push the earth forwardly at all times.

In the use of the apparatus, the axis of the cutting and excavating tool may be vertical, or at any angle to the vertical. The plates 20 can be made of any desired length or height.

The links 15 permit the ploughs 18 and the retaining plates 20 to ride up and down, so as to compensate for irregularities in the earth-line.

The mechanism is operative, even when the shaft of the auger is close to the vertical direction.

The shield 30 preferably extends below the bottom of the cutting and excavating device or devices.

The support 1 and the tool are preferably operated continuously and in unison, but the invention includes intermittent operation of either or both of said elements.

The invention is not limited to the use of a single cutting and excavating tool. Likewise, the invention is not limited to any particular angular relation between the longitudinal axis of the cutting and excavating tool, and the median vertical plane of the trench.

We have described a preferred embodiment of our invention, but it is clear that numerous changes and omissions can be made without departing from its spirit. Likewise, the invention includes numerous valuable subcombinations, which can be used independently of the complete apparatus described herein.

The bottom cutting member 36 and its cutting blades 37 constitute an important part of our invention. If such cutting blades are omitted, the auger does not operate when it makes a small angle with the vertical direction. As shown in Fig. 1, supporting member 34 comprises a base portion, an upstanding extension and an arm which is located at the upper end of said extension. Said arm of the supporting member 34 is fixed to the reduced bottom end 28a of the shaft 28.

Fig. 3 shows the reduced end 28a of shaft 28, extending downwardly beyond the bottom edges of the cutting blades 37. However, said arm of the supporting member 34 can be made relatively thin, and the extension 28a can be relatively short, and the nut 35 can be made relatively thin, so that the bottom edges of the cutting blades 37 will extend downwardly beyond the nut 35 and the tip of the reduced bottom end 28a.

As shown in Fig. 1 herein, the edges of the cutting blades 37 cut the material which is to be excavated so that the tip of the auger is held spaced from the uncut material. The axis of the auger can therefore be maintained at a small angle to the vertical direction, during the operation of the device.

If the cutting blades 37 are omitted, the auger tilts away from the vertical direction, when it is attempted to operate the auger at a small angle to the vertical direction. It is highly desirable, in many cases, to rotate the auger while its shaft is close to the vertical direction.

We claim:

1. Trench-excavating mechanism comprising a movable support, a turnable auger turnably mounted in said support, said auger being turnable around the longitudinal axis of said auger, said auger extending downwardly from said movable support below the ground level, mechanism mounted on said support to rotate said auger around its longitudinal axis, said auger having a helical cutting flight which is operative to cut the material which is to be excavated and to propel said cut material upwardly above the ground level, said auger having cutting means at its bottom end, said cutting means comprising cutting blades which are spaced radially from said axis of said auger, said cutting blades being thus radially spaced to exert their cutting action in substantially the same circumferential zone as said helical flight, said cutting blades being fixed to respective radial arms which are wholly spaced from each other, said cutting blades being separated from each other by intermediate spaces.

2. Trench-excavating mechanism according to claim 1, in which said auger is tiltable relative to said support around an axis of tilt which is transverse relative to said longitudinal axis.

FRANK A. ENGEL.
DENNIS J. MANNING.

REFERENCES CITED

The following references are of record in the file of this patent:

UNITED STATES PATENTS

| Number | Name | Date |
|---|---|---|
| 785,302 | Fullard | Mar. 21, 1905 |
| 799,753 | O'Connor | Sept. 19, 1905 |
| 2,048,710 | Ranney | July 28, 1936 |
| 2,360,334 | Engel et al. | Oct. 17, 1944 |